United States Patent [19]

Keller

[11] Patent Number: 4,869,911

[45] Date of Patent: Sep. 26, 1989

[54] METHOD FOR PRODUCING EXPANDED, FARINACEOUS FOOD PRODUCT

[75] Inventor: Lewis C. Keller, Watauga, Tex.

[73] Assignee: Frito-Lay, Inc., Dallas, Tex.

[21] Appl. No.: 300,184

[22] Filed: Jan. 23, 1989

Related U.S. Application Data

[63] Continuation of Ser. No. 917,245, Oct. 7, 1986, abandoned, which is a continuation of Ser. No. 728,215, Apr. 29, 1985, abandoned.

[51] Int. Cl.$^4$ .............................................. A21D 13/00
[52] U.S. Cl. ...................................... 426/94; 426/283; 426/448; 426/449
[58] Field of Search ................... 426/449, 93, 94, 89, 426/283, 564, 571, 447, 448, 284, 549

[56] References Cited

U.S. PATENT DOCUMENTS

| | | | |
|---|---|---|---|
| 3,480,445 | 11/1969 | Slaybaugh | 426/284 |
| 3,615,675 | 7/1967 | Fowler et al. | 426/284 |
| 3,655,404 | 4/1972 | Glasser | 426/549 |
| 4,126,336 | 7/1979 | Brown, Jr. et al. | 426/623 |
| 4,162,333 | 7/1979 | Nelson et al. | 426/283 |
| 4,511,585 | 4/1986 | Durst | 426/549 |
| 4,569,848 | 2/1986 | Giorgetti et al. | 426/94 |
| 4,582,711 | 4/1986 | Durst | 426/549 |
| 4,613,509 | 9/1986 | Ward et al. | 426/283 |

FOREIGN PATENT DOCUMENTS 2131670 6/1984 United Kingdom .
2136666 9/1984 United Kingdom .

OTHER PUBLICATIONS

Del Valle et al., *Journal of Food Science*, 46:129-197 (1981).
Anderson et al., *Cereal Chemistry*, 58(5):370-374 (1980).
K. Seiler, *Gertreide, Mehl und Brot.*, 36, (9), 242-246 (1982).
Vernois, *Zeitschrift Fuer Die Zuckerindustrie*, 25, (6), 351 (1975).

*Primary Examiner*—Carolyn Paden
*Attorney, Agent, or Firm*—Bernard, Rothwell & Brown

[57] ABSTRACT

An expanded farinaceous food product is produced without the use of a drying apparatus. A farinaceous food mixture containing from about 5 weight percent to about 17 weight percent of at least one plasticizer selected from monosaccharides, polysaccharides, and edible alcohols and having a moisture content of from about 9% to about 17% is plasticized in an extruder barrel having a barrel pressure equal to or in excess of the vapor pressure of the water in the mixture; and the plasticized mixture is extruded through a profile die into a zone of ambient pressure below the vapor pressure of the water in the mixture.

11 Claims, No Drawings

METHOD FOR PRODUCING EXPANDED, FARINACEOUS FOOD PRODUCT

This is a continuation of application Ser. No. 917,245, filed Oct. 7, 1986 which is a continuation of application Ser. No. 728,215, filed Apr. 29, 1985, both now abandoned.

BACKGROUND OF THE INVENTION

1. Field of the Invention

This invention relates to the production of expanded (puff extruded) farinaceous food products which can be incorporated into composite, center-filled snack products or other products, corn puffs, crispbread crackers, or other types of extruded products. In particular, the invention relates to a method of producing a crisp, expanded, farinaceous food product which eliminates the necessity of using a drying oven or other drying devices to produce a final product having the desired characteristics.

2. Prior Art

U.S. Pat. No. 3,615,675 describes a method of producing a light, puffed or expanded food product which has a core filled with an edible paste-like or creamy material. The expanded outer shell is produced by developing a mass of farinaceous food material containing a liquid; the development taking place under superatmospheric pressures at temperatures above the boiling point of the liquid, and then extruding the mass of farinaceous material through an orifice. Upon emerging from the orifice, the material expands significantly due to the vaporization of a portion of the liquid in the material. The material is extruded through a die having a generally annular cross-section. A filling tube extends coaxially through the center of the annular extrudate so that a filling material such as cheese fillings, peanut butter or the like can be injected into the interior of the expanded, farinaceous material to create a composite food product.

The farinaceous material which is extruded in the process of U.S. Pat. No. 3,615,675 contains from about 10% to 25% water. Generally, this process requires that water, in addition to that naturally present as moisture in the farinaceous material, e.g., corn meal, be added to the farinaceous material either before it enters the extruder or within the extruder barrel in order to allow the material to develop sufficient plasticity and flowability to be extruded.

Upon emerging from the extruder die, the extrudate has sufficient dimensional stability to be self-supporting. But, the water content of the extrudate is too high to allow for the crisp, crunchy texture which is desirable in the final product. Consequently, the product must be dried by passing it through a drying apparatus such as an oven to drive off a sufficient amount of water necessary to obtain the desired texture. Drying is also an important consideration in imparting shelf stability to the product. In order for the product produced by the prior art process to have the desirable crisp, crunchy texture and to maintain its texture over a reasonable shelf life, the moisture must be reduced to a level on the order of 2% to 3% by weight of the product. The use of drying ovens to achieve the necessary reduction in moisture content contributes significantly to the cost of the product, inasmuch as the ovens consume a great deal of energy, and considering the capital cost of large industrial scale drying ovens. Moreover, since the product must pass through the drying oven as it moves linearly from the extruder, the drying ovens take up a significant amount of floor space, further adding to the cost of the process.

There is a need in the art for a process for producing an expanded, farinaceous food product which has a crisp texture and commercially acceptable shelf life without the necessity of using a drying oven or other drying apparatus to remove water from the product.

Advantageously, the expanded, farinaceous food product having a crisp texture should be capable of being incorporated into a composite food product in contact with a paste-like or creamy material without undergoing a loss of texture.

SUMMARY OF THE INVENTION

The invention provides a method and composition for producing an expanded, farinaceous food product without the use of a drying oven or other drying apparatus, which comprises plasticizing a farinaceous food mixture containing from about 5 weight percent to about 17 weight percent of at least one plasticizer selected from monosaccharides, polysaccharides, and edible alcohols, including ethanol and glycerol, and having a moisture content from about 9 weight percent to about 17 weight percent in an extruder barrel having a barrel pressure equal to or in excess of the vapor pressure of the water in the mixture; and extruding the plasticized mixture through a profile die into a zone of ambient pressure below the vapor pressure of the water in the mixture. As the extrudate emerges from the die into the zone of reduced pressure, a portion of the water in the mixture is vaporized, thereby causing the product to expand. The final product has a moisture content from about 4 weight percent to about 8 weight percent and a water activity ($A_w$) from about 0.30 to about 0.45.

The plasticizer employed in the farinaceous food mixture serves several important functions. It allows the development of the desired degree of plasticity and flowability in the mixture with considerably less water present than would otherwise be required. Generally, the moisture which is normally present in the farinaceous materials, e.g., corn meal, wheat flour, etc., is sufficient, when the plasticizer is present, to allow for efficient extrusion and puffing of the mixture. The necessity of adding water to the mixture—and more importantly, the necessity for subsequent removal of the added water in a drying apparatus—is thereby avoided.

Unexpectedly, I have found that incorporation of the plasticizer results in an expanded, farinaceous food product which exhibits a crispy texture and is shelf stable at moisture contents as high as about 4% to about 8%. By comparison, prior art compositions which do not contain the plasticizer cannot be produced with a crispy texture without drying them to a final moisture content of 2% to 3%. By eliminating the need to add water to the granular or powdered mixture in order to facilitate extrusion, and by allowing higher residual moisture in the final product without unacceptable change in texture, the process of the invention avoids the need for a drying apparatus.

DETAILED DESCRIPTION OF THE PREFERRED EMBODIMENTS

The food material which may be used in the process of the invention can be any farinaceous material. The material will generally be in granular or powdered form such as meal, flour, or starch derived from corn, wheat, rice, oats, barley, potatoes, rye, tapioca, and other cereal crops, legumes or tubers. The preferred farinaceous material is corn meal. The granular or powdered farinaceous food mixture used in the process contains between about 9 weight percent and about 17 weight percent moisture, based on total weight of the mixture. The farinaceous material, as it is provided from a flour milling operation, usually contains sufficient moisture to provide this level. However, if necessary, a small amount of water can be added to achieve the desired level.

The plasticizer is selected from the group consisting of monosaccharides, polysaccharides, edible alcohols and mixtures thereof. Mixtures of polysaccharides employed preferably have a substantial portion of this mixture consisting of mono-, di-, and tri-saccharides. Useful monosaccharides include, for example, glucose (dextrose) and fructose. The useful polysaccharides include disaccharides, such as sucrose and maltose, and mixtures of various chain length saccharides, such as corn syrup solids, maltodextrins, and polydextrose. The useful edible alcohols include ethanol and glycerol. It is preferred to use plasticizers selected from the group consisting of sucrose, corn syrup solids, maltodextrin, polydextrose, and glycerol. Corn syrup solids of varying dextrose equivalents (DE) have been used successfully. One embodiment of the subject invention uses Maltrin® M365 (DE 36) manufactured and sold by Grain Processing Corporation of Muscatine, Iowa which contains about 50% saccharides of chain length of 3 saccharide units or less. However, the process has also been used successfully with other polysaccharide mixtures having other dextrose equivalents. For example, FRO-DEX® Z 24 (DE 28) manufactured by American Maize-Products Company of Hammond, Ind. contains about 25% mono-, di-, and tri-saccharides and FRO-DEX® 42 (DE 42) contains about 45% mono-, di-, and tri-saccharides. Both of these have performed similarly when compared with the Maltrin® M365. The particular choice of plasticizer may depend on a number of practical factors, including cost and the flavor desired in the end product. Since the expanded farinaceous product may be used in conjunction with a filling material such as a savory cheese filling, it is often desired that the farinaceous product have a minimal amount of sweetness. Large amounts of sucrose, dextrose, or fructose should be avoided in such case. Corn syrup solids or maltodextrins, on the other hand, are only slightly sweet and polydextroses are essentially non-sweet. Glycerol has a slight sweetness, but its flavor is generally not considered agreeable when used at relatively high concentrations.

For producing a low-sweetness expanded farinaceous product, we prefer to employ, as the plasticizer component, a mixture containing from about 4.0% to 6.0% corn syrup solids, from about 0.5% to 2.0% sucrose, from about 3.0% to 6.0% polydextrose and from about 0.5% to 2.5% glycerol, based on the total weight of the farinaceous food mixture which is fed to the extruder.

Whereas the preceding is directed to the preparation of low sweetness expanded farinaceous products, this invention may also be used for the preparation of moderate to high sweetness expanded farinaceous products. This can be accomplished by using higher levels of the sweeter tasting plasticizers, such as sucrose, fructose, and glucose or other sweeteners known to those skilled in the art. In this case, the sweeter tasting plasticizers can be used alone or in combination with the less sweet plasticizers at levels of from about 6.0 weight percent to about 15.0 weight percent.

If desired, other conventional additives can be present in the farinaceous food mixture. For example, emulsifiers, salt, fats, food dyes and flavorings may be present in the mixture in the amounts necessary to provide a desired effect.

An appropriate apparatus for making the products of this invention includes an extruder which discharges the food material through a profile die. The extruder is capable of generating superatmospheric pressures and elevated temperatures in the material being extruded. Preferably, the extruder employed is a twin screw extruder. The twin screw extruder houses two adjacent, parallel screws which are operated in a co-rotating mode. Suitable twin screw extruders can be obtained commercially and include, for example, a Baker-Perkins model MPF-50D twin screw extruder.

In the practice of this invention, it is preferred to employ a screw configuration which imparts relatively low shear forces to the farinaceous food material. A preferred screw for use in conjunction with a Baker Perkins MPF-50D twin screw extruder has the following configuration, proceeding from the inlet of the barrel towards the die:

First, a 10" long metering screw;
Second, a 3½" long 30° forward paddle section;
Third, a 3" long single lead screw;
Fourth, a 2" long 60° forward paddle section;
Fifth, a 6" long single lead screw;
Sixth, a 2" long 60° forward paddle section;
Seventh and last, a 3" long single lead screw.

The farinaceous food mixture is placed in a feed hopper which feeds the extruder barrel. As the mixture is moved through the extruder barrel by the action of the rotating extruder screws, the farinaceous food mixture becomes plasticized and flowable. The heat required to plasticize the mixture is generated by the shearing action of the screws. Heating and cooling devices can also be mounted along the extruder to impart or remove heat in order to obtain the desired temperature profile.

As the farinaceous food material moves through the barrel, the barrel pressure increases. The pressure in the barrel equals or exceeds the vapor pressure of the water in the farinaceous food mixture at all times, thus preventing the water from vaporizing prior to emergence from the extruder. Generally, the extruder is operated to produce a barrel pressure of at least 1100 psig and a temperature of at least 121° C. within the barrel.

The plasticized farinaceous food mixture exits the extruder barrel through a profile die which can form the plasticized, farinaceous food mixture into the desired cross-sectional configuration. In a preferred configuration used in conjunction with the Baker-Perkins model MPF-50D extruder, the die is mounted 20 mm from the end of the barrel and is positioned equidistant between the screw axes. The die has a diameter of 14 mm and a land length of 18 mm. The profile orifice is a 2.54 mm wide C-shaped slit comprising 300° of a full circle with a central diameter of 5.08 mm (3.81 mm diameter across the inside of the slit, and 6.35 mm diameter across the slit) and having a land length of 3 mm.

The hot, plasticized, farinaceous food mixture emerges from the die into a zone of ambient pressure below the vapor pressure of the water in the mixture; that is, normal atmospheric pressure. Upon emerging from the die, the plasticized, farinaceous food mixture is exposed to the reduced pressure environment, thus readily allowing a portion of the water in the mixture to vaporize so that there is formed a highly porous, puffed, cellular body. In the process of so doing, the residual moisture in the farinaceous product is reduced to a level from about 4 weight percent to about 8 weight percent.

Any suitable die configuration can be employed, depending on the particular product which one desires to make by the process of the invention. For example, one can employ a die having a generally annular or a C-shaped opening to produce a tubular extrudate or a C-shaped extrudate. The hollow portion of the extrudate can then be filled with a flavoring material; e.g., a paste-like or creamy material such as a cheese-flavored filling or peanut butter. For the relatively sweet extrudates, sweet fillings of various compositions and flavors may also be used.

One particularly advantageous aspect of the present invention is that filling can be accomplished by having a filling tube run through the center of the die which continuously fills the extrudate as it emerges from the die, using a die arrangement similar to that shown in U.S. Pat. No. 3,615,675. The significance of this advance is that numerous fillings which are not heat-stable, and which previously could only be added after the extrudate had been dried, can now be added immediately after extrusion, thereby greatly simplifying the entire process. Alternatively, the extrudate can be comminuted into sections or pieces and the individual pieces can be filled in a subsequent operation. In another embodiment, a C-shaped extrudate can be filled immediately as it exits the die. The resultant composite food product comprises a crisp, expanded, farinaceous outer shell having a generally annular or C-shaped cross section and an inner, flavored filling material.

One can also produce other products such as corn puffs, crispbread crackers, and cookie-like pieces by extruding the farinaceous food mixture through an appropriate die.

As previously indicated, the extrudate does not require the use of a drying apparatus such as an oven to remove moisture. As it emerges from the die, the extrudate has a temperature from about 121° C. to about 163° C. and is soft, yet self-supporting. The product can be subjected to further processing, e.g., comminuting, seasoning, etc., as soon as it has cooled sufficiently to become rigid and dimensionally stable. If desired, air cooling or other means may be employed to assist in cooling the extrudate. By eliminating the drying stage from the production process, the total length of a production line, excluding the extruder, for an expanded, farinaceous food product has typically been reduced from about 130 feet to 30 feet or less.

The expanded, farinaceous food product of the invention has a water activity from about 0.30 to about 0.45. Water activity, which is the ratio of the fugacity of water in the substance being studied (i.e., the crisp, expanded, farinaceous food product) to the fugacity of pure water, can be considered to be a measure of the tendency of the substance to allow water migration. The low water activity of the product of the invention contributes to its excellent shelf-stability, particularly when the product is in the form of a composite with a filling material where it is important to prevent migration of moisture between the two materials.

The following example is intended to further illustrate the practice of the invention and is not intended to limit the scope of the invention in any way.

EXAMPLE

A non-sweet, whole wheat flavored product was prepared from the following ingredients:

| Ingredients | Parts By Weight |
| --- | --- |
| Whole Wheat Flour | 58.09 |
| Corn Cones (Corn Meal) | 28.00 |
| Corn Syrup Solids (Dextrose Equivalent = 34–38) | 5.00 |
| Polydextrose | 3.70 |
| Sucrose | 1.20 |
| Glycerol | 2.50 |
| Salt | 0.50 |
| Monoglycerides | 0.30 |
| Annatto Powder | 0.01 |
| Water | 0.70 |
|  | 100.00 |

The ingredients (100 pounds) were thoroughly blended and charged to the hopper of a Baker-Perkins MPF-50D twin screw extruder having a low-shear screw configuration. The barrel had five temperature control zones from the hopper forward. The barrel temperature controls were set as follows:

| Zone 1 | 120° F. |
| --- | --- |
| Zone 2 | 160° F. |
| Zone 3 | 170° F. |
| Zone 4 | 180° F. |
| Zone 5 | 190° F. |

The extruder discharged through a die plate having four C-shaped dies, each located equidistant from the die plate center and each having an open cross-sectional area of 14.1 mm$^2$.

The farinaceous food mixture, which had a moisture content of 10.8%, was extruded at a rate of 151 pounds/hour. Water was injected into the extruder barrel at a flow rate of 4 to 6 pounds/hour in order to bring the moisture content of the material in the barrel to a level of 13.1% to 14.2%. Typical product temperature measurements during extrusion were as follows:

| Zone 1 | 115 ± 5° F. |
| --- | --- |
| Zone 2 | 150 ± 5° F. |
| Zone 3 | 160 ± 5° F. |
| Zone 4 | 190 ± 5° F. |
| Zone 5 | 200 ± 5° F. |

Pressure at the die was 1600–1700 psi.

The product emerged expanding from the dies at a temperature of between about 275° F. and about 325° F. The expanded product cooled to near ambient temperature in about two minutes. The texture was crisp and crunchy, even though a drying oven was not used. Water content of the product was 6.5% and its A$_w$ was 0.398. The product was suitable for filling with a paste-like or creamy filling material such as a cheese-flavored filling to produce a shelf-stable snack product.

What is claimed is:

1. A method for producing an expanded, farinaceous food product without the use of a drying oven which comprises plasticizing a farinaceous food mixture containing from about 5 weight percent to about 17 weight percent of at least one plasticizer selected from monosaccharides, polysaccharides, and edible alcohols and having a moisture content from about 9 weight percent to about 17 weight percent in an extruder barrel having a barrel pressure equal to or in excess of the vapor pressure of the water in the mixture; and extruding the plasticized mixture through a profile die into a zone of ambient pressure below the vapor pressure of the water in the mixture, thereby producing a crisp product having a moisture content from about 4 weight percent to about 8 weight percent and a water activity from about 0.30 to about 0.45.

2. A method as claimed in claim 1, wherein the plasticizer is selected from the group consisting of maltodextrin, polydextrose, sucrose, corn syrup solids, and glycerol.

3. A method as claimed in claim 1, wherein the plasticizer is a mixture containing from about 4% to about 6% corn syrup solids, from about 3% to about 6% polydextrose, from about 0.5% to about 2% sucrose, and from about 0.5% to about 2.5% glycerol, based on the total weight of the farinaceous food mixture.

4. A method as claimed in claim 1 comprising adding as the plasticizer from about 6 weight percent to about 15 weight percent, based on the total weight of the farinaceous food mixture, one or more of the group consisting of sucrose, maltose, fructose, dextrose, polysaccharides, and edible alcohols.

5. A method as claimed in claim 1, wherein the farinaceous food mixture is plasticized by contacting it with co-rotating twin extruder screws in the extruder barrel.

6. A method as claimed in claim 1, wherein the farinaceous food mixture contains at least one material selected from the group consisting of meals, flours, and starches derived from corn, wheat, rice, oats, barley, potatoes, rye, tapioca and other cereal crops, legumes, and tubers.

7. A method as claimed in wherein the farinaceous food mixture contains corn meal.

8. A crisp, expanded, farinaceous food product, having a moisture content from about 4 weight percent to about 8 weight percent and a water activity of from about 0.30 to about 0.45, which is produced by the process of claim 1, 2, 3, 4, 5, 6, or 7.

9. A composite food product comprising a crisp, expanded, farinaceous outer shell comprising a material which is produced by the process of claim 1, 2, 3, 4, 5, 6, or 7, and an inner, flavored filling material, said outer shell having a generally annular or C-shaped cross-section.

10. A composite food product as claimed in claim 9, wherein the inner, flavored filling material is cheese flavored.

11. A composite food product as claimed in claim 9 wherein the inner, flavored filling material is a sweet confectionary filling.

* * * * *

UNITED STATES PATENT AND TRADEMARK OFFICE
CERTIFICATE OF CORRECTION

PATENT NO. : 4,869,911
DATED : September 26, 1989
INVENTOR(S) : Lewis C. Keller

It is certified that error appears in the above-indentified patent and that said Letters Patent is hereby corrected as shown below:

On the title page, [56], line 6, "3,615,675 7/1967 Fowler et al. . . . 426/284" should be --3,615,675 10/1971 Wisdom et al. . . 99/83--.

Title page, [56], line 8, "4,126,336" should be --4,162,336--.

Title page, [56], under OTHER PUBLICATIONS, line 1, "46:129-197" should be --46:192-197--.

Title page, [56], under OTHER PUBLICATIONS, line 3, "Anderson" should be --Andersson--.

Col. 3, line 34, delete "Z".

Col. 8, line 10, after "in" insert --claim 1,--.

Signed and Sealed this

Fifth Day of April, 1994

Attest:

BRUCE LEHMAN

*Attesting Officer*  *Commissioner of Patents and Trademarks*